(12) United States Patent
Maurello et al.

(10) Patent No.: US 11,051,646 B2
(45) Date of Patent: Jul. 6, 2021

(54) COOKING APPARATUS

(71) Applicant: JMM VISIONARY, LLC, Oceanside, NY (US)

(72) Inventors: John M Maurello, Oceanside, NY (US); John Michael Maurello, Oceanside, NY (US)

(*) Notice: Subject to any disclaimer, the term of this patent is extended or adjusted under 35 U.S.C. 154(b) by 169 days.

(21) Appl. No.: 15/458,903

(22) Filed: Mar. 14, 2017

(65) Prior Publication Data

US 2017/0332821 A1 Nov. 23, 2017

Related U.S. Application Data

(60) Provisional application No. 62/278,848, filed on Jan. 14, 2016.

(51) Int. Cl.
| | |
|---|---|
| *A47J 27/00* | (2006.01) |
| *A47J 36/06* | (2006.01) |
| *A47J 36/16* | (2006.01) |
| *A47J 37/12* | (2006.01) |
| *B65D 21/08* | (2006.01) |

(52) U.S. Cl.
CPC ............. *A47J 27/002* (2013.01); *A47J 36/06* (2013.01); *A47J 36/16* (2013.01); *A47J 37/1295* (2013.01); *A47J 37/129* (2013.01); *B65D 21/086* (2013.01)

(58) Field of Classification Search
CPC .... A47J 37/129; A47J 37/1295; B65D 21/086
USPC .................. 99/417, 450, 413, 415; 220/8
See application file for complete search history.

(56) References Cited

U.S. PATENT DOCUMENTS

| | | | | |
|---|---|---|---|---|
| 1,237,580 A | * | 8/1917 | Tashima .................. | A47J 27/04 99/415 |
| 4,222,493 A | * | 9/1980 | Friedman ................. | A47J 27/13 220/8 |
| 4,329,977 A | * | 5/1982 | Orter ....................... | A47J 36/18 126/369 |
| 5,662,026 A | * | 9/1997 | Prakasa ................... | A47J 27/13 126/373.1 |
| 7,921,769 B2 | * | 4/2011 | So ........................... | A47J 43/24 210/380.1 |
| 8,668,123 B2 | * | 3/2014 | Richmond .............. | A45C 11/00 224/312 |
| 2012/0248106 A1 | * | 10/2012 | Marta .................. | B65D 21/086 220/8 |

FOREIGN PATENT DOCUMENTS

DE 4107584 A1 * 9/1992 ......... B65D 11/1873

* cited by examiner

*Primary Examiner* — Reginald Alexander
(74) *Attorney, Agent, or Firm* — Law Offices of Alozie N. Etufugh, PLLC

(57) ABSTRACT

The invention features a cooking apparatus having a number of compartments for the cooking of different foods under different cooking conditions. Aspects of embodiments of the contemplated invention include a lid portion, an upper portion that is vertically retractable and removably engaged with a bottom portion. The cooking apparatus is modular and, as such, enables the use of multiple cooking apparatuses for the steaming and/or boiling of different foods within the same pot or cooking unit at the same time.

17 Claims, 13 Drawing Sheets

COOKING APPARATUS

CROSS-REFERENCE TO RELATED APPLICATIONS

This application claims the benefit of, and is related to, Applicant's following provisional patent application: U.S. Provisional Patent Application No. 62/278,848 titled "COOKING APPARATUS" filed Jan. 14, 2016, which is incorporated herein in its entirety.

FIELD OF THE INVENTION

The present invention relates, in general, to a cooking apparatus and in particular, a cooking apparatus designed to, inter alia, cook different kinds of foods within different compartments at the same time.

BACKGROUND OF THE INVENTION

Different kinds of food, such as pasta, vegetables and/or rice etc. are cooked in different ways and at different times. In some instances, families interested in cooking different kinds of food at the same time, have to cook each food separately. This takes time and uses up resources by way of electric and/or gas bills as each food dish would have to be cooked separately and at different times.

As such, there is a need for a cooking apparatus which would enable different kinds of food to be cooked at the same time and within the same pot or cooking utensil. There is also a need for a cooking apparatus that may be adaptable to existing pots and cooking utensils that people currently have in their homes. This reduces or eliminates the added cost that such an apparatus would ordinarily incur as users of the contemplated invention would not have to purchase a new pot.

SUMMARY OF THE INVENTION

An aspect of an embodiment of the present invention contemplates a cooking apparatus which may have an upper portion which may include a cooking compartment for cooking food, a lid portion shaped to cover the upper portion and a bottom portion which may include a cooking compartment for cooking food, wherein the bottom portion is structurally configured to be in a vertically retractable relationship with the upper portion, wherein the bottom portion may be vertically elevated from the bottom of the pot or cooking unit.

In an aspect of an embodiment of the present invention, the bottom portion may include fenestrations along its sidewalls and base.

In an aspect of an embodiment of the present invention, the bottom portion may include engagement bosses where the upper portion may also include corresponding engagement points which enable engagement with the bottom portion bosses.

In an aspect of an embodiment of the present invention, the upper and bottom portions may be structurally adapted to fit within a pot.

In an aspect of an embodiment of the present invention, the bottom portion may include base structures at the bottom portion's base. These structures enable the bottom portion to sit at a height off the bottom surface of a pot or cooking unit.

In an aspect of an embodiment of the present invention, the upper portion may include a lower portion having fenestrations and a second upper portion having no fenestrations. In an aspect of an embodiment of the present invention, the fenestrations enable infusion of steam, water and/or liquid into the bottom portion food compartment.

In an aspect of an embodiment of the present invention, the upper portion may include one or more latching mechanism(s) for engagement of the upper portion with the edge of a pot. This/these ensure(s) attachment of the cooking apparatus to the pot.

In an aspect of an embodiment of the present invention, the upper portion may include one or more slot(s) for enabling engagement of the upper portion with the lid portion.

In an aspect of an embodiment of the present invention, the fenestrations of the upper portion, as engagement points, may be structurally enabled and/or configured to engage bosses of the bottom portion. As the upper portion is vertically moved upward from the bottom portion, the bosses may then engage with the upper portion fenestrations in order to affix the cooking apparatus portions in a certain way—for example, to lower the bottom portion into the pot or cooking unit, lower fenestrations of the upper portion may be used to engage the bottom portion bosses. To elevate the bottom portion, the bottom bosses may be elevated to engage with higher positioned engagement points or fenestrations of the upper portion. Doing so enables food to be steamed, boiled or cooked depending on the position of the bottom portion relative to the bottom of the pot and/or any liquid within the pot or cooking unit. In an aspect of an embodiment of the present invention, the bosses may be positioned a quarter inch distance from each other.

In an aspect of an embodiment of the present invention, the lid portion may include a handle and engagement lips or structures for engaging the lid portion with the upper portion. In another aspect, the lid, once firmly locked in place, may act as a handle for lifting the cooking apparatus out of the pot or cooking unit.

In an aspect of an embodiment of the present invention, the upper portion may be completely detached from the bottom portion. This may ease the cleaning of the cooking apparatus.

In an aspect of an embodiment of the present invention, the bottom portion may be retracted into the upper portion to enable steaming of food within the bottom portion's compartment.

In an aspect of an embodiment of the present invention, the bottom portion may be extended from the upper portion to enable cooking/boiling of food within the bottom portion's compartment.

In an aspect of an embodiment of the present invention, each of the upper and bottom portions has one or more side(s) that may conform(s) to the shape of a pot.

Additional aspects, objectives, features and advantages of the present invention will become apparent from the following description of the preferred embodiments with reference to the attached drawings. The invention has been described in detail with particular reference to certain preferred embodiments thereof, but it will be understood that variations and modifications can be effected within the spirit and scope of the invention.

DETAILED DESCRIPTION OF THE INVENTION

Figure 1A:
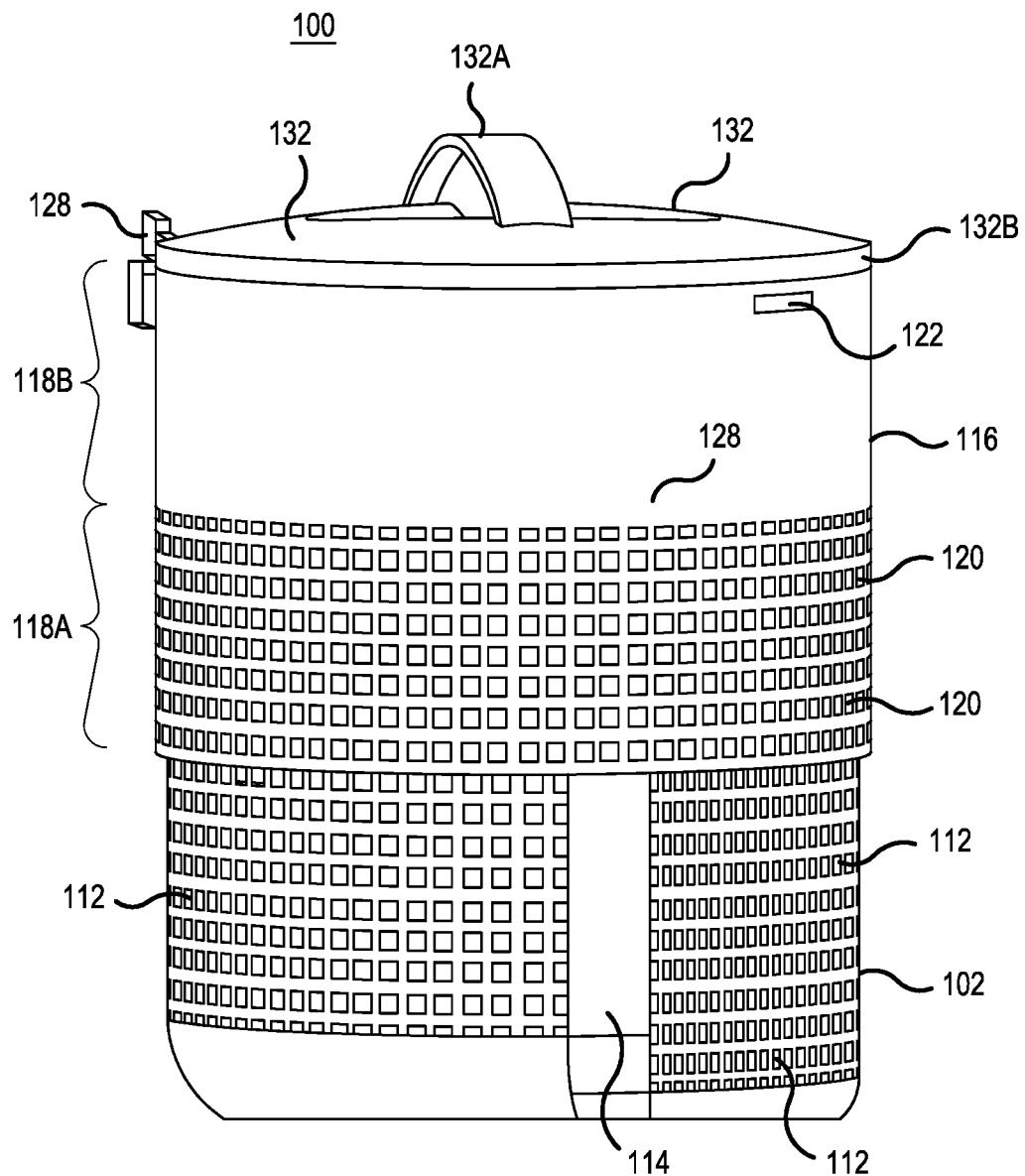
FIG. 1A illustrates a side view of all portions of the cooking apparatus according to an aspect of an embodiment of the present invention.
Figure 1B:
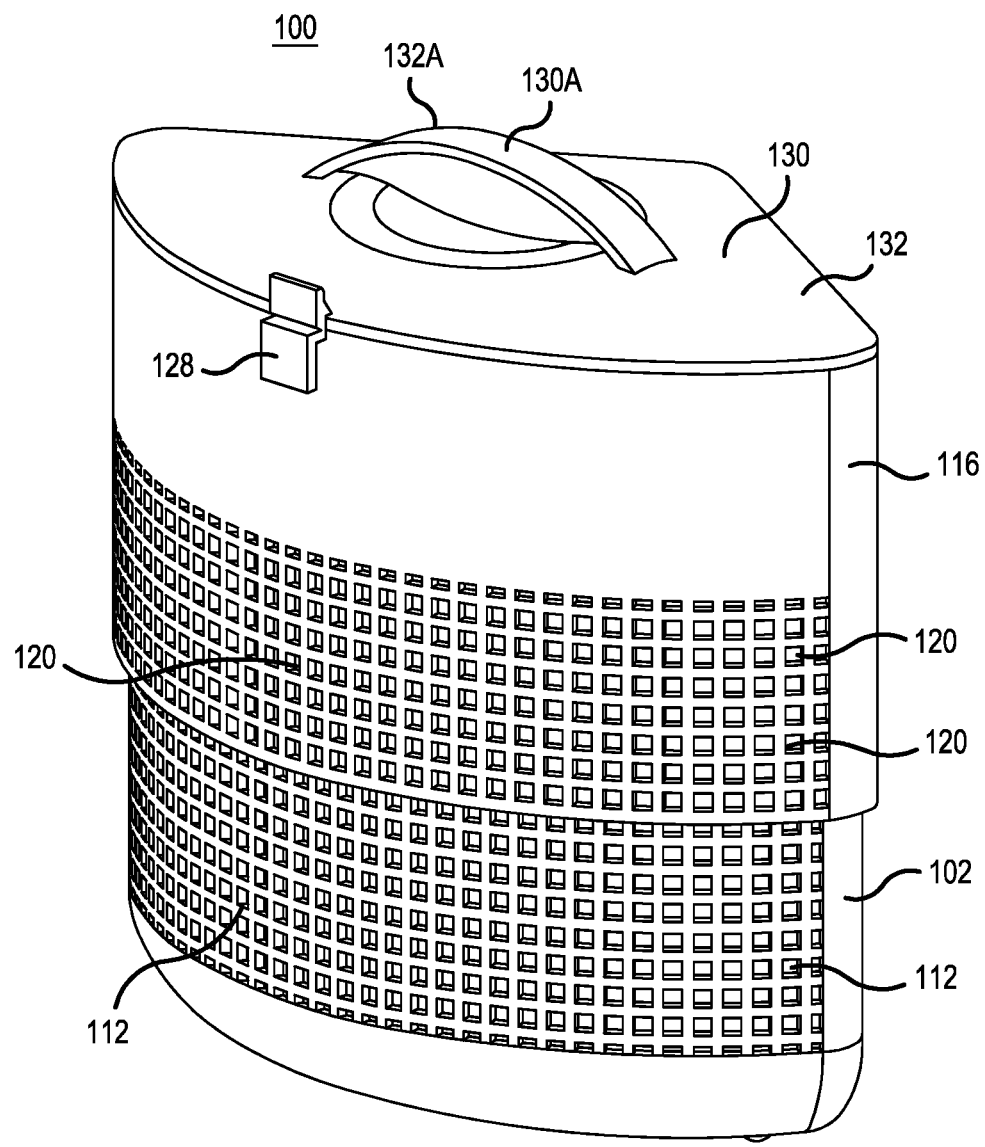
FIG. 1B illustrates a top perspective view of the cooking apparatus according to an aspect of an embodiment of the present invention.
Figure 2A:
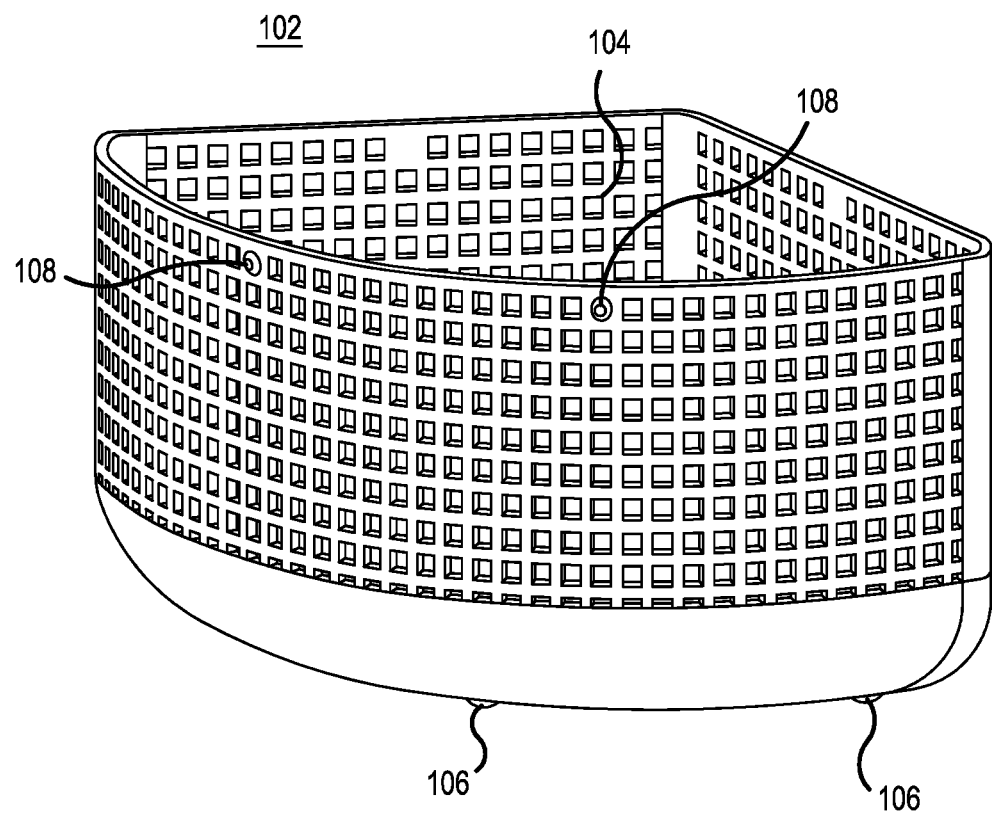
FIG. 2A illustrates a perspective view of the bottom portion of the cooking apparatus according to an aspect of an embodiment of the present invention.
Figure 2B:
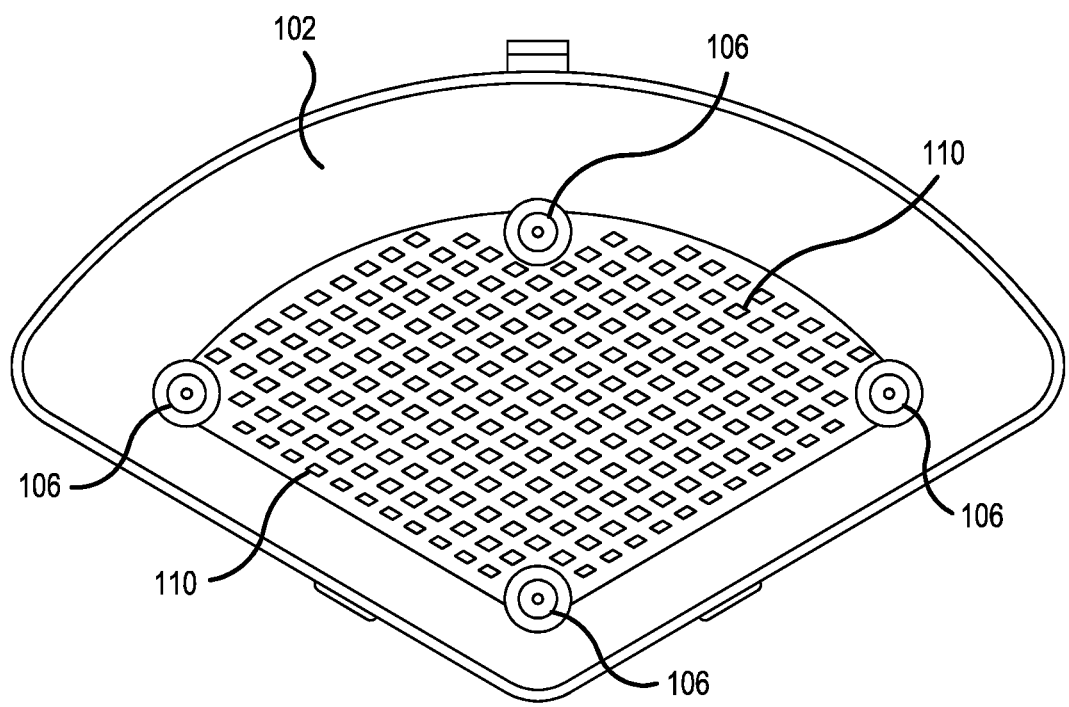
FIG. 2B illustrates a view of the bottom portion of the cooking apparatus according to an aspect of an embodiment of the present invention.
Figure 3:
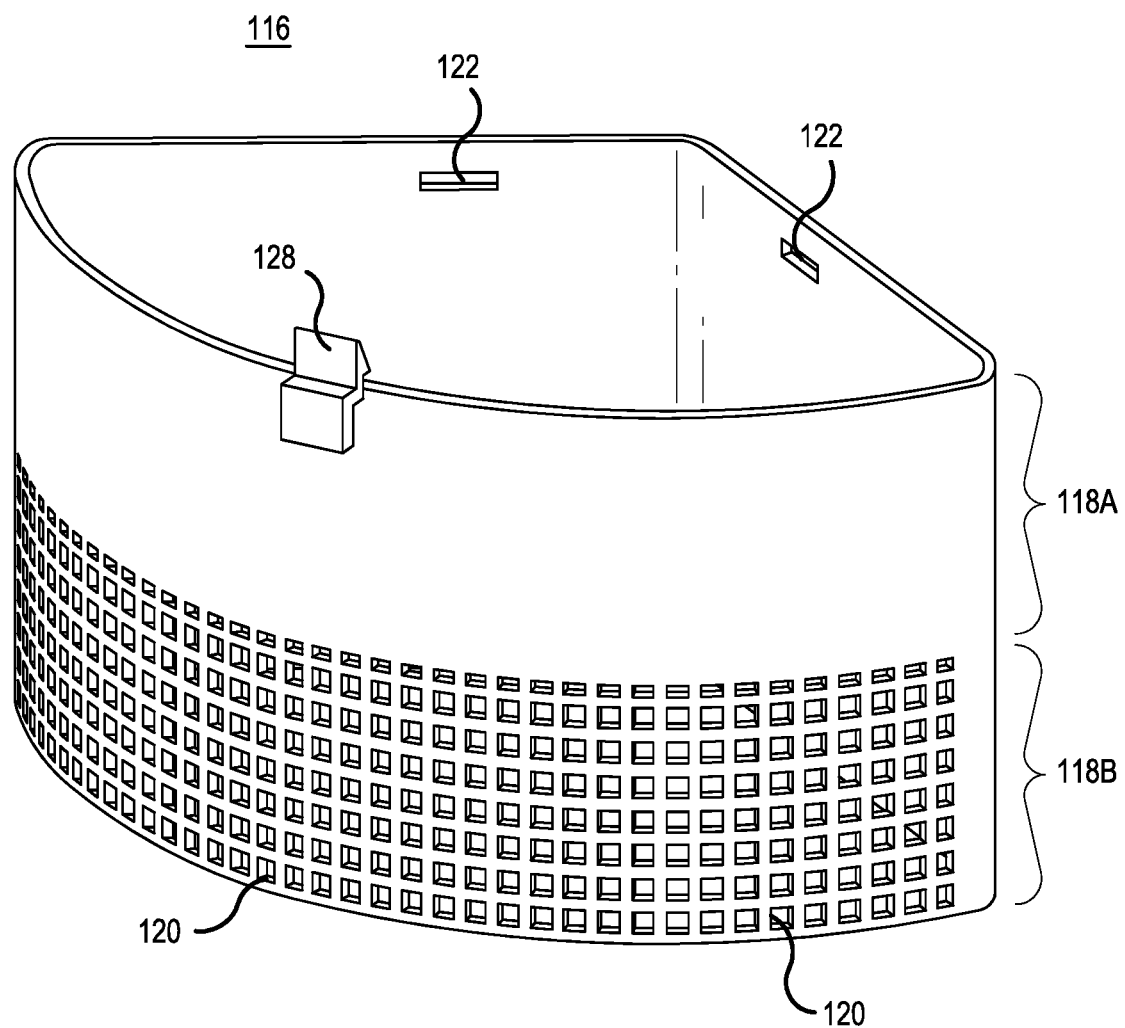
FIG. 3 illustrates a perspective view of the upper portion of the cooking apparatus according to an aspect of an embodiment of the present invention.
Figure 4A:
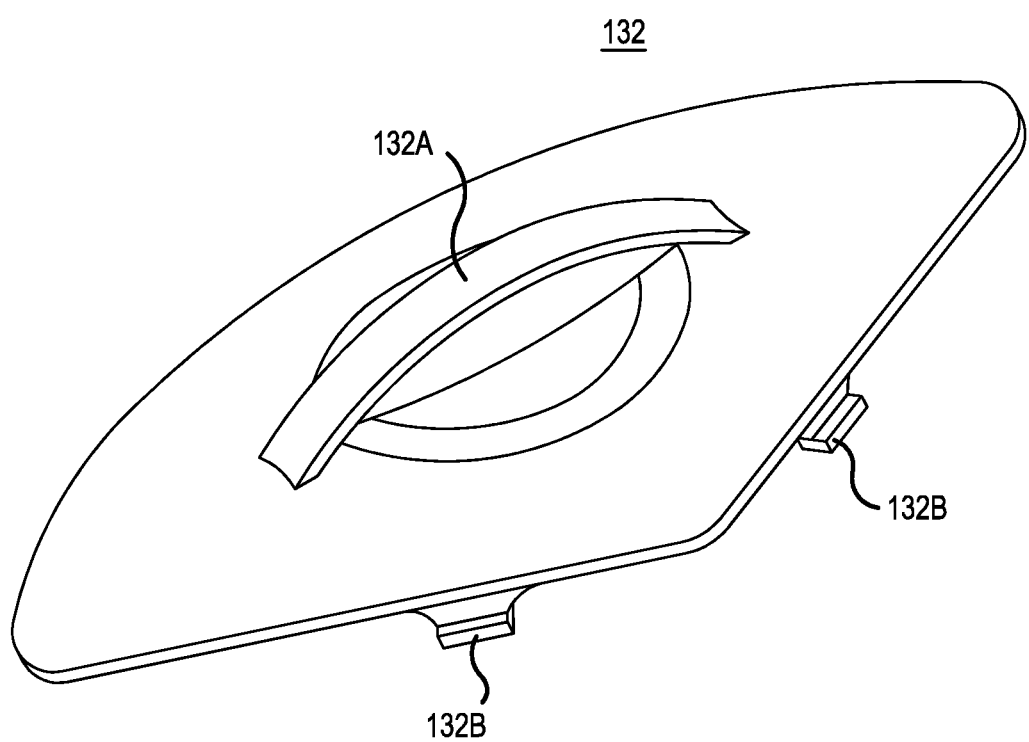
FIG. 4A illustrates a perspective view of the lid portion of the cooking apparatus according to an aspect of an embodiment of the present invention.
Figure 4B:
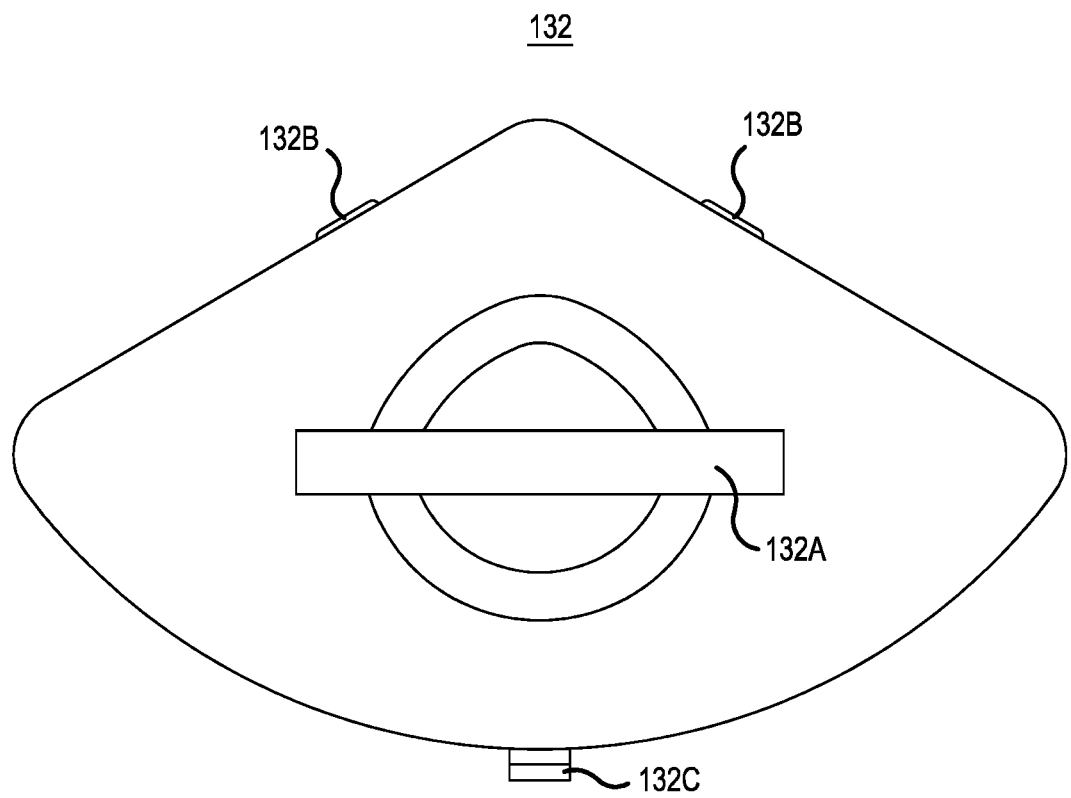
FIG. 4B illustrates a top view of the lid portion of the cooking apparatus according to an aspect of an embodiment of the present invention.
Figure 4C:
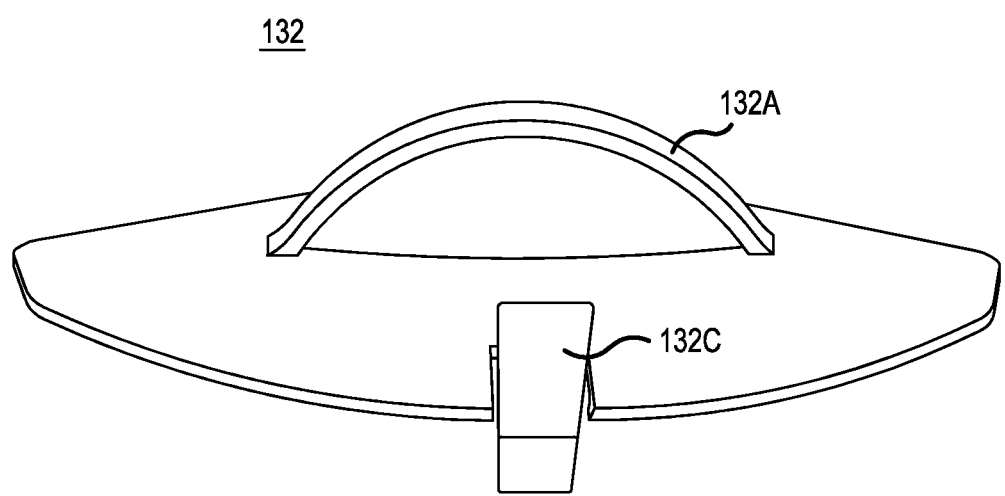
FIG. 4C illustrates a top perspective view of the lid portion of the cooking apparatus according to an aspect of an embodiment of the present invention.
Figure 4D:
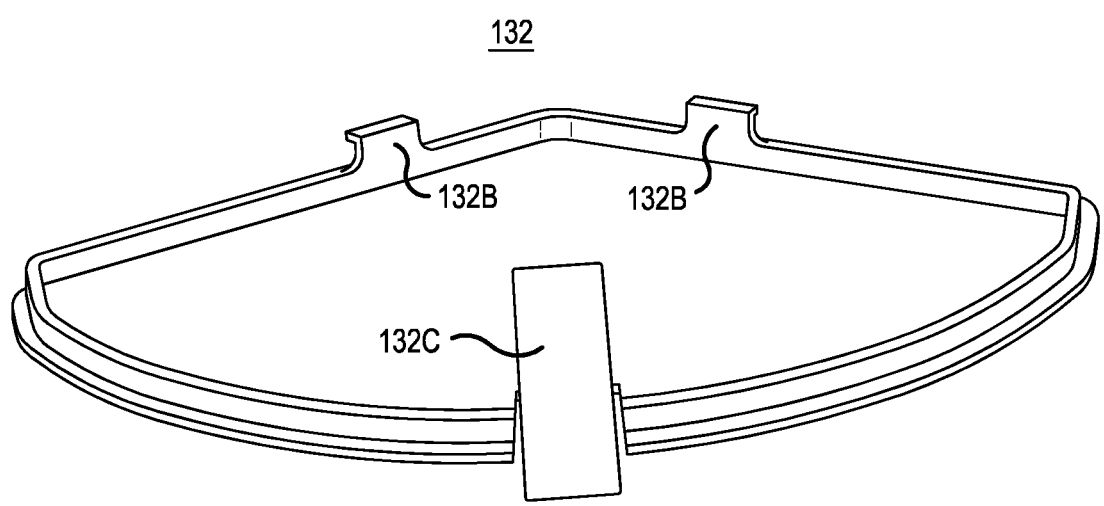
FIG. 4D illustrates a bottom view of the lid portion of the cooking apparatus according to an aspect of an embodiment of the present invention.

Referring now to FIGS. 1A-4D, overall and perspective views of a cooking apparatus 100, detailed views of cooking apparatus 100's bottom 102 and upper 116 portions and lid 132 are all shown according to aspects of embodiments of the present invention. Cooking apparatus 100 includes bottom portion 102 which has a cooking compartment 104 where food may be placed for cooking. Bottom portion 102 may also include base structures (FIG. 2B) which enable bottom portion 102 to be placed at a height above the bottom of a pot or cooking unit. Bottom portion 102 also includes a plurality of sidewall fenestrations 110 along its sidewalls and base fenestrations 112. Fenestrations 110, 112 of bottom portion 102 enable infusion of water, liquid and/or steam to cook food placed within cooking compartment 104.

Positioned around and relatively above bottom portion 102 is upper portion 116. Upper portion 116 includes a plurality of fenestrations 120 along its walls. Fenestrations 120 enable infusion of water, liquid and/or steam to cook food placed within cooking apparatus 100. In another aspect of an embodiment of the present invention, upper portion 116 may include a lower portion 118A with fenestrations and a second upper portion 118B without fenestrations. In an aspect of an embodiment of the present invention, the fenestrations 120 of lower portion 118A located at the base of upper portion 116, are structurally configured (structurally conforming), as engagement points, to engage with the bosses 108 of bottom portion 102.

As upper portion 116 is vertically moved upward from bottom portion 102, the bosses may then engage with the upper portion fenestrations in order to affix the cooking apparatus portions in a certain way—for example, to lower bottom portion 102 into the pot or cooking unit, lower fenestrations of the upper portion may be used to engage bottom portion 102 bosses 108. To elevate bottom portion 102, the bottom bosses may be elevated to engage with higher positioned engagement points or fenestrations of the upper portion. Doing so enables food to be steamed, boiled or cooked depending on the position of bottom portion 102 relative to the bottom of the pot and/or any liquid within the pot or cooking unit. In an aspect of an embodiment of the present invention, the bosses may be positioned a quarter inch distance from each other. Upper portion 116 may also include latching mechanism(s) 128 which latches upper portion 116 to a pot or a cooking unit.

Cooking apparatus 100 may also include lid portion 132 which covers upper portion 116. Lid portion 132 includes handle 132A which enables lifting of lid portion 132 and engagement lips or structures 132B. Engagement lips 132 enable locking lid portion 132 with upper portion 116 by way of their engagement with slots 122 of upper portion 116. In an aspect of an embodiment of the present invention, lid 132 may include latch 132C for affixing lid 132 to upper portion 116.

Figure 5:
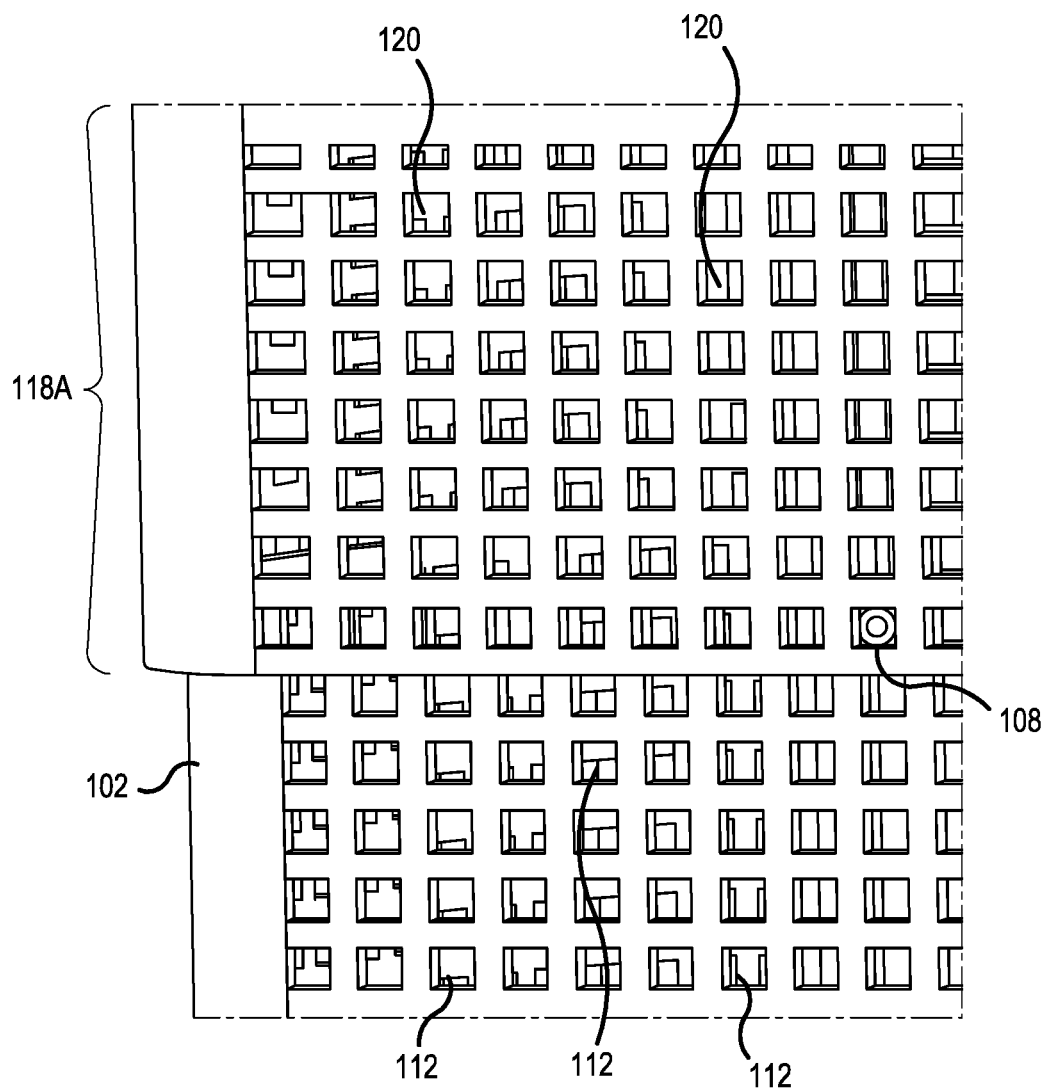
FIG. 5 illustrates a detailed view of an engagement between a boss and an engagement point of the cooking apparatus according to an aspect of an embodiment of the present invention.

Referring now to FIG. 5 a detailed view of an engagement between boss 108 of bottom portion 102 and engagement point 124 of upper portion 116 is shown according to an aspect of an embodiment of the present invention. Along the walls and base of bottom portion 102 are sidewall bosses 108 which enable engagement with corresponding engagement points 124 of upper portion 116. In an aspect of an embodiment of the present invention, the bosses may be interspersed along the sidewalls of bottom portion 102. In another aspect, the bosses may be positioned with uniform spaces between each other. In one aspect, they may be located at quarter inch distances from each other. Bosses 108, by way of their engagement with engagement points 124 enable the elevation of bottom portion 102 and affixing of bottom portion 102 once a desired height away from the base of the pot or cooking unit has been attained.

Figure 6A:
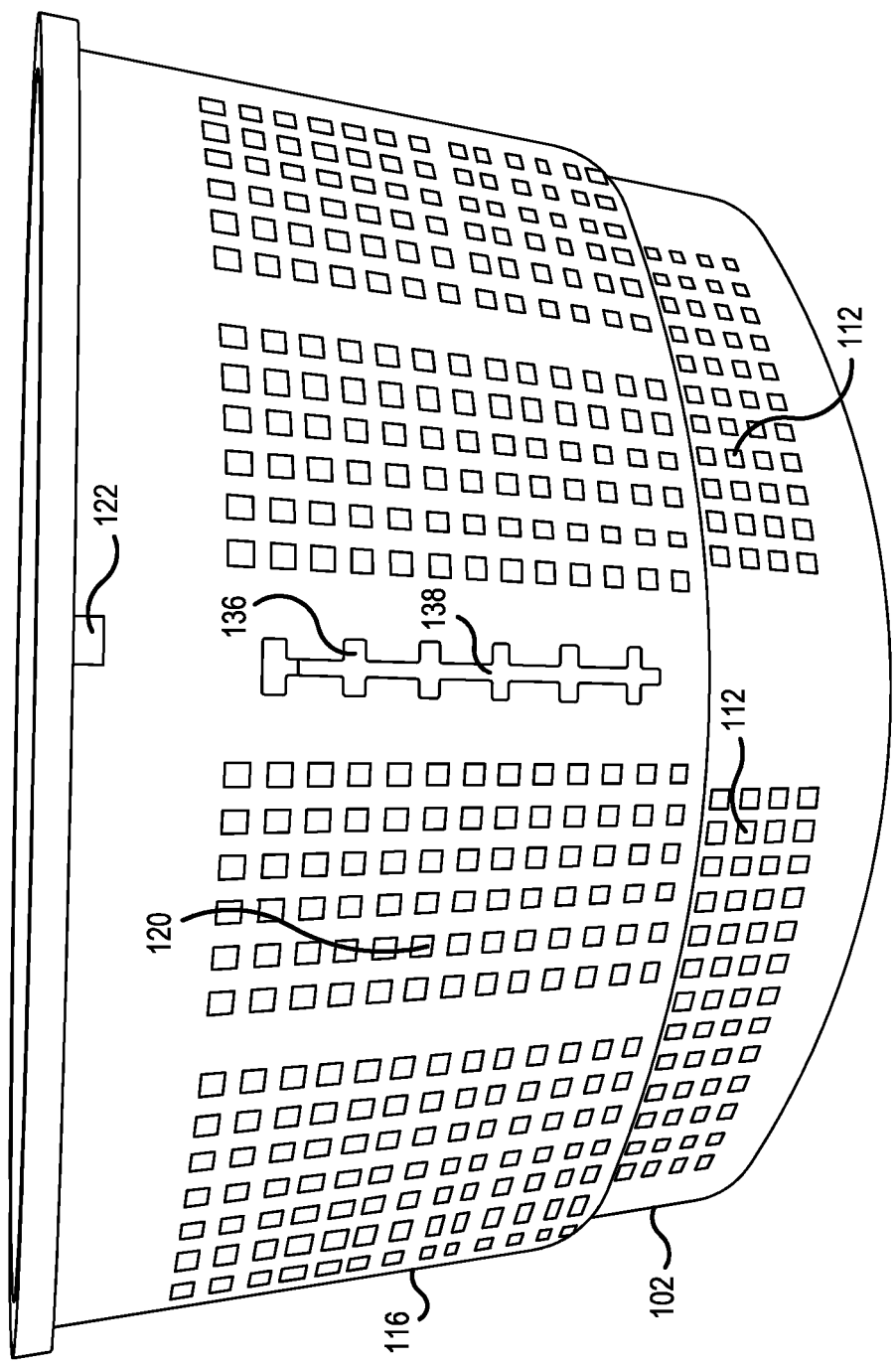
FIG. 6A illustrates a side view of a cooking apparatus showing an elevation configuration according to an aspect of an embodiment of the present invention.
Figure 6B:
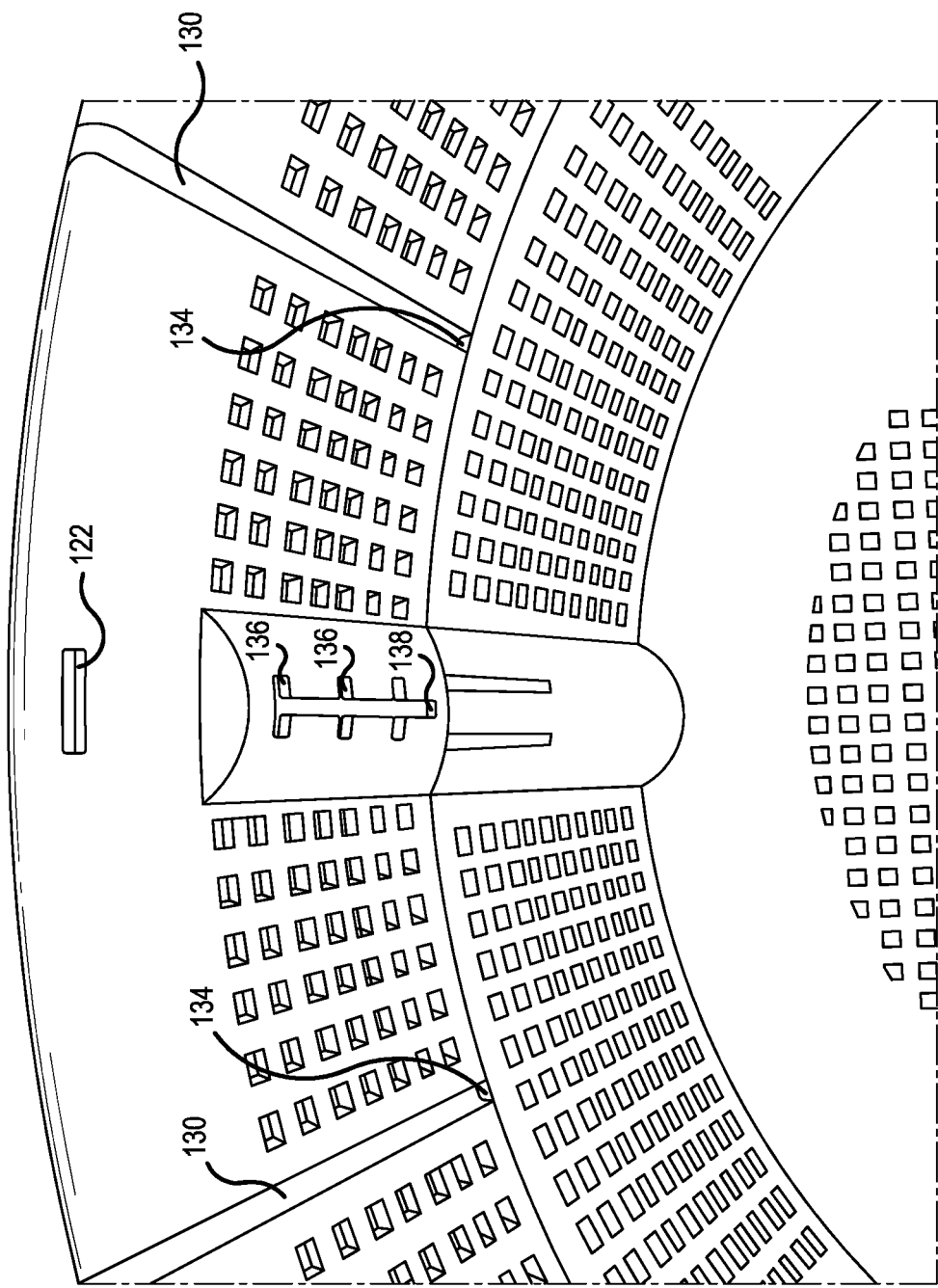
FIG. 6B illustrates an interior view of a cooking apparatus showing an elevation configuration according to an aspect of an embodiment of the present invention.

Referring now to FIGS. 6A and 6B, side and interior views of a cooking apparatus showing an elevation configuration are shown according to an aspect of an embodiment of the present invention. In an aspect of an embodiment of the present invention, upper portion 116 may include track channel(s) 130 which enable engagement and vertical movement of guides 134 of bottom portion 102. This arrangement enables vertical movement of bottom portion 102 within upper portion 116 to elevate bottom portion 102 away from the base of the pot or cooking unit or to lower it closer (or to) the bottom of the pot/cooking unit. In an aspect of an embodiment of the present invention, guides 134 may include a system of wheels which engage track channel 130 and enable vertical movement of bottom portion 116.

Cooking apparatus 100 may include a system for raising or lowering bottom portion 102. This system may include a number of vertically spaced openings 136 on upper portion 116 and a corresponding member 138 of bottom portion 102 for engaging the opening 136 at the desired height to lock bottom portion 102 in place. To raise bottom portion 102 above and away from the base of the pot/cooking unit, bottom portion 102 would be vertically raised using the track channels 130 of upper portion 116 and guides 134.

Once the desired height has been attained, bottom portion 102 may be held or locked in place using engaging member 138 to engage the opening at the desired height.

Figure 7:
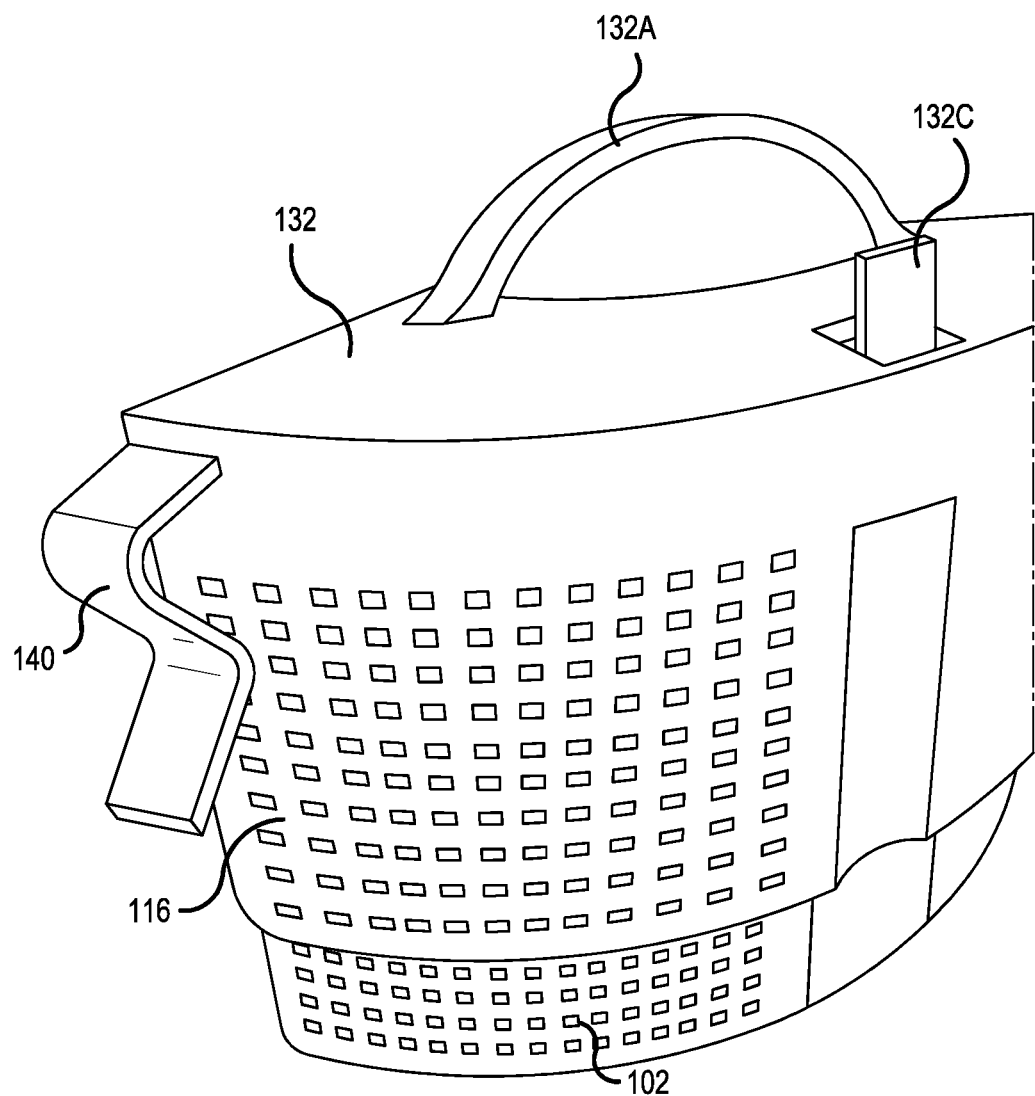
FIG. 7 illustrates a perspective view of a cooking apparatus according to an aspect of an embodiment of the present invention.

Referring now to FIG. 7, a perspective view of a cooking apparatus 100 is shown according to an aspect of an embodiment of the present invention. Here, cooking apparatus 100 is seen with handle 140 which enables easy removal of cooking apparatus 100 from the pot/cooking unit.

An aspect of an embodiment of the present invention contemplates multiple cooking apparatuses 100. For instance, cooking apparatus 100 may be shaped to occupy a third of the pot or cooking unit. In this instance, the cooking pot or cooking unit may accommodate three cooking apparatuses 100, comprising a system of same, with each having its own upper (116) and bottom (102) sections and other elements as described in the foregoing disclosure. In an aspect an embodiment of the present invention, cooking apparatus 100 may be modular thereby further comprising of connectors to enable connection with other cooking apparatuses 100.

The invention has been described in detail with particular reference to certain preferred embodiments thereof, but it will be understood that variations and modifications can be effected within the spirit and scope of the invention.

What is claimed is:

1. A cooking apparatus comprising:
   an upper portion, comprising of an open base, at least two vertical openings and at least one track channel;
   a lid portion shaped to cover and engage the upper portion, wherein the upper portion comprises of at least one slot for enabling engagement of the upper portion with a corresponding lip of the lid portion; and
   a bottom portion, surrounded by the upper portion, the bottom portion comprising of a cooking compartment for cooking food, wherein the bottom portion is connected with the upper portion by way of track guides of the bottom portion within the at least one track channel of the upper portion and by way of engagement of a member of the bottom portion with the at least one vertical opening of the upper portion.

2. The cooking apparatus of claim 1 wherein the bottom portion comprises of a plurality of fenestrations along its surface.

3. The cooking apparatus of claim 1 wherein the bottom portion comprises of engagement bosses and wherein the upper portion comprises of corresponding engagement points which enable engagement with the bottom portion bosses.

4. The cooking apparatus of claim 1 wherein the upper and bottom portions are structurally adapted to fit within a pot.

5. The cooking apparatus of claim 1 wherein the upper portion comprises of a lower portion having fenestrations and a second upper portion having no fenestrations.

6. The cooking apparatus of claim 1, wherein the upper portion comprises of at least one latching mechanism for engagement of the upper portion with the edge of a pot.

7. The cooking apparatus of claim 6 wherein the fenestrations are structurally configured to engage bosses of the bottom portion.

8. The cooking apparatus of claim 1 wherein the lid portion comprises of a handle and engagement structures for engaging the lid portion with the upper portion.

9. The cooking apparatus of claim 1 wherein the upper portion may be detached from the bottom portion.

10. A cooking apparatus comprising:
    an upper portion, comprising of an open base and a plurality of fenestrations along its sidewalls;
    a lid portion shaped to cover and engage the upper portion, wherein the upper portion comprises of at least one slot for enabling engagement of the upper portion with a corresponding lip of the lid portion; and
    a bottom portion, surrounded by the upper portion, the bottom portion comprising of a cooking compartment for cooking food, wherein the bottom portion is connected with the upper portion by way of a plurality of bosses along (Original) The cooking compartment sidewalls with the bosses engaging with the fenestrations.

11. The cooking apparatus of claim 10, wherein the bottom portion comprises of engagement bosses and wherein the upper portion comprises of corresponding engagement points which enable engagement with the bottom portion bosses.

12. The cooking apparatus of claim 10, wherein the upper and bottom portions are structurally adapted to fit within a pot.

13. The cooking apparatus of claim 10, wherein the upper portion comprises of a lower portion having fenestrations and a second upper portion having no fenestrations.

14. The cooking apparatus of claim 10, wherein the upper portion comprises of at least one latching mechanism for engagement of the upper portion with the edge of a pot.

15. The cooking apparatus of claim 13, wherein the fenestrations are structurally configured to engage bosses of the bottom portion.

16. The cooking apparatus of claim 10, wherein the lid portion comprises of a handle and engagement structures for engaging the lid portion with the upper portion.

17. The cooking apparatus of claim 10, wherein the upper portion may be detached from the bottom portion.

* * * * *